June 20, 1961  H. A. FULTON ET AL  2,989,071
BALL COCK VALVE
Filed May 16, 1957
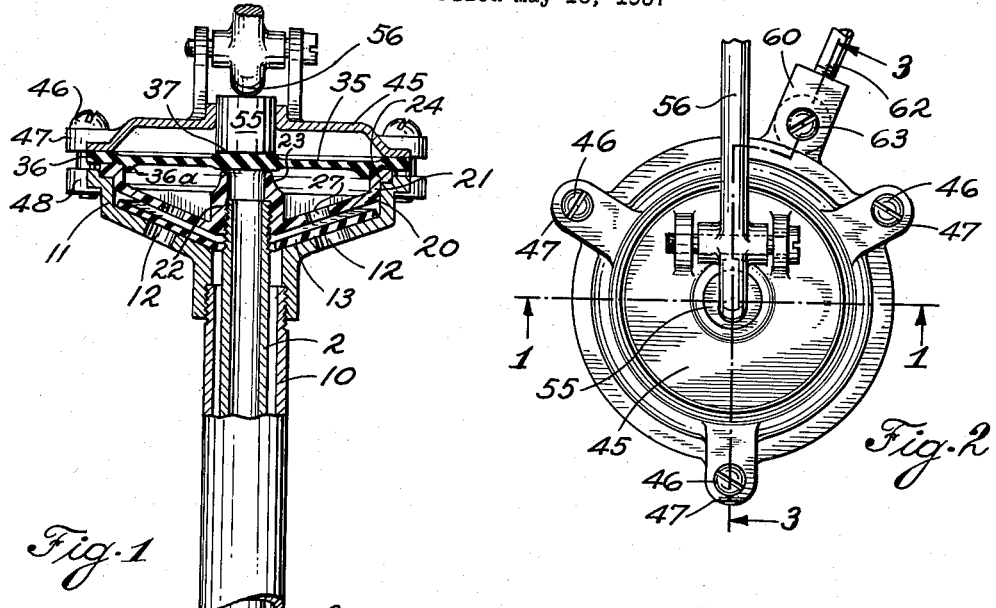
INVENTORS
HOWARD A. FULTON
& IRA GLENN HENRY
BY
RICHEY, WATTS, EDGERTON,
McNENNY & FARRINGTON
ATTORNEYS

2,989,071
BALL COCK VALVE
Howard A. Fulton and Ira Glenn Henry, Perrysville, Ohio, assignors to Mansfield Sanitary, Inc., a corporation of Ohio
Filed May 16, 1957, Ser. No. 659,586
1 Claim. (Cl. 137—437)

This invention relates generally to inlet valves for water closet flush tanks and is particularly concerned with a new inlet valve of the partition type for use with stationary hush pipes in which the elements are so arranged that much less noise is created during the use of this valve than in the use of conventional valves of the same type.

Prior inlet valves of the partition type operate more quietly than conventional valves but not as quietly as desired. The present invention aims to produce a valve which will be considerably quieter in operation than such prior valves and attains this object by employing new elements and a new combination of elements which reduces the turbulence of the water flowing through the valve.

We have found that noise created during the use of a valve of the type described is primarily due to turbulence in the water which is created in certain parts of the valve. More specifically we have found that when the time required for filling the tank to a predetermined level is less than a certain minimum, an amount of turbulence is created which produces objectionable noise. Similarly we have found that objectionable turbulence may be created when the distance between the partition and the flexible ring therebeneath is greater than a certain maximum distance.

The present invention avoids the objectionable turbulence and resulting noise caused by too rapid filling of the tank to a predetermined level by maintaining the filling time below a certain minimum time and accomplishes this result by adjusting the valve to the pressure of water delivered into it. Thus by varying the extent of the valve opening in accordance with the water pressure, the tank may be filled to the predetermined extent in substantially the same predetermined, noise avoiding time with water at high or low pressure, the valve being opened wider for the low pressure water than for the high pressure water. Similarly by maintaining a maximum, noise avoiding distance between the lower side of the partition and the upper side of the flexible ring in the valve body, turbulence in this space can be largely avoided and hence the operation of the valve made quieter.

The present invention will be better understood from the following specification and the accompanying drawings in which:

FIG. 1 is a side elevational view, partly in section, taken on line 1—1 of FIG. 2 showing one form of apparatus embodying this invention;

FIG. 2 is a top plan view of the apparatus of FIG. 1;

FIG. 3 is an enlarged cross-sectional view taken on line 3—3 of FIG. 2; and

FIG. 4 is a top plan view of the partition shown in FIGS. 1 and 3.

In the drawings 1 designates a part of the bottom wall of the flush tank and 2 indicates an inlet pipe which is assembled in fluid tight contact with wall 1 being attached to a spud 3 having a flange 4 bearing on the top side of a gasket 5 which rests on the inner surface of the bottom wall of the tank and is pressed thereagainst by a nut 6 on the spud and bearing against the outer surface of the bottom wall of the tank. A spring 7 coiled around pipe 2 serves to retard the flow of water between the pipes 2 and 10 and thereby to reduce the noise of flowing water. Spring 2 may extend as far as desired between these pipes.

The hush pipe 10 surrounds the inlet pipe and carries at its upper end a valve body 11. This body has a conical bottom through which a plurality of holes 12 extend around the hush pipe. A flexible ring 13 is disposed in the body adjacent to the inner surface of the hole bearing portion and is of such size as to cover holes 12 when deflected downwardly.

A partition 20 is fixed to the upper end of the inlet pipe. This partition is disc-shaped and is dished to provide an outwardly projecting rim 21. This partition also has a central portion 22 which is fixed to the inlet pipe and an outwardly extending valve seat 23 which is aligned with the inlet pipe. The rim 21 is formed with a shoulder 24 to rest on a corresponding shoulder in the body and extends outwardly beyond the outer end of the valve body. Preferably the rim is provided with a plurality of small, closely spaced, outwardly projecting conical portions 25. Also preferably a plurality of ribs 26 extend radially out from the valve seat portion 23 toward the rim. A plurality of holes extend through the partition radially outside of the inlet pipe 2 and when the partition is provided with ribs 26, the holes are disposed between these ribs. The holes 27 are so disposed with respect to the flexible ring 13 that they will be covered by that ring when it bears against the lower surface of the partition.

A resilient disc-shaped valve 35 has a peripheral portion 36 which is engageable with the rim 21 of the partition and has a central portion 37 which is engageable with the valve seat 23. Preferably the valve 35 has an inwardly extending annular rib 36a which lies close to the inside surface of rim 21 when the partition and valve are in assembled position. This rib serves to deflect water issuing under pressure from the inlet pipe away from the joint between the rim of the partition and the valve and hence makes easier the problem of sealing that joint.

A cover 45 for the valve body is secured thereto as by screws 46 which extend through ears 47 on the cover and into tapped holes in corresponding ears 48 on the body. By tightening these screws the cover effectively presses the valve against the rim of the partition with fluid sealing engagement.

A plunger 55 engages the outer surface of valve 35 and projects through cover 45 where it is engaged by one end of a float carrying lever 56 which is pivotally supported by cover 45. The valve body is also provided with a laterally extending projection 60 which has a passage 61 therethrough. A refill pipe 62 is connected to this projection. The flow of water through passage 61 may be regulated by screw 63 which is carried by projection 60 and extends into passage 61.

The above-described apparatus operates substantially as follows:

When the water level in the flush tank falls due to opening of the flush valve and the float follows the water level down, the lever 56 exerts progressively less and less pressure on plunger 55 so that the water under pressure in inlet pipe 2 may lift the central part of valve 35 off valve seat 23 with resultant flow of water into the space between the valve and the partition. This water flows through the holes 27 in the partition, presses the flexible ring down against the body with resultant closing of holes 12 and escapes from the body into the hush pipe 10 around the inlet pipe 2 and flows into the tank at the bottom of the hush pipe.

When the water level in the tank rises high enough for the float ball to press the lever 56 against plunger 55 with force enough to overcome the pressure of the water in inlet pipe 2, the central part of the valve 35 is pressed into fluid sealing engagement with the valve seat 23 with resultant interruption of the flow of water from the inlet pipe into the valve body. As the water drains out of the valve body, the flexible ring 13 is free to move in the space between valve body 11 and partition 20. If the water pressure in inlet pipe 2 should fail and create a partial vacuum in the valve body above the partition, the resulting suction will move the flexible ring 13 up against the under surface of the partition 20 with resultant closing of the holes 27 therethrough and effectual prevention of any back flow of water in the tank through the partition and into the inlet pipe.

It will be understood that lever 56 is controlled by a float (not shown) which is pressed upwardly by water in the tank and that this float is carried on rod 57 which is threaded through a hole in lever 56. By turning rod 57 the space between the end of the rod and the body 11 may be varied and, by reason thereof, the extent of movement of plunger 55 and valve 37 away from seat 23 may be correspondingly varied.

Since water pressures vary widely in different localities and the predetermined level of water in the tank also varies depending on a variety of conditions, it is not possible to state herein the maximum time for filling the tank which should be observed to maintain the noise level below a predetermined amount. However, the maximum time for filling the tank under any of the numerous conditions may be determined by the simple expedient of starting with the end of the rod 57 far enough away from the body 11, when the valve is open sufficiently, to create objectionable noise and then turning the rod in lever 56, and thereby reducing the space between seat 23 and valve 37, until the noise level has been reduced as much as is desired or to the maximum extent. With such a setting of the parts the tank filling time will be substantially constant regardless of the water pressure. When these adjustments are made with water pressure which is high, the space between the valve and the seat will be small as compared with the space when the water pressure is low and hence the filling time in these two instances will be approximately equal and the noise level will be low and also approximately equal.

The space between the lower side of partition 20 and the upper side of ring 13 should be small. Preferably the distance between these two surfaces should range between about .100″ and .110″. This range will not only prevent turbulence which would occur in larger spaces and hence avoid the noise traceable to such turbulence but will also permit slight variations in thickness of ring 13 such as occur in ordinary manufacture.

The ribs 26 on the top of partition 20 also tend to prevent turbulence and hence reduce noise.

Having thus described this invention in such full, clear, concise and exact terms as to enable any person skilled in the art to which it pertains to make and use the same, and having set forth the best mode contemplated of carrying out this invention, we state that the subject-matter which we regard as being our invention is particularly pointed out and distinctly claimed in what is claimed, it being understood that equivalents or modifications, or substitutions for, parts of the above specifically described embodiments of the invention may be made without departing from the scope of the invention as set forth in what is claimed.

What is claimed is:

An inlet valve for a flush tank comprising an inlet pipe having its outlet end above the water level in the tank, a hush pipe around the inlet pipe, a valve body attached to the hush pipe and having holes therethrough adjacent to said inlet pipe, a rigid, dished, disc-shaped partition in the body having a lower side, an upwardly projecting rim having an outwardly extending flange, a central portion directly connected to the inlet pipe and an upwardly extending valve seat, said partition having radial outwardly extending ribs and holes therethrough between said ribs, means for controlling the flow of water through said inlet pipe comprising a resilient, disc-shaped valve in the body having a peripheral portion overlapping and engageable with the outwardly extending flange of said partition, an inwardly extending annular rib disposed within and close to said rim and a central portion engageable with said seat, a valve cover engageable with said peripheral portion of the resilient valve, means to clamp the overlapping peripheral portion of the valve and the flange of the partition between the cover and body with liquid sealing contact, a plunger engaging the central part of the valve and extending through said cover, a float ball lever pivotally carried by the cover and engageable with said plunger, and means to prevent back flow of water into the inlet pipe including a flexible ring in the body around the inlet pipe on the lower side of said partition to close the holes therethrough and open the holes in the body adjacent to the inlet pipe when the fluid pressure in the inlet pipe decreases.

References Cited in the file of this patent

UNITED STATES PATENTS

| | | |
|---|---|---|
| 2,667,177 | Smith | Jan. 26, 1954 |
| 2,770,250 | Smith | Nov. 13, 1956 |
| 2,791,235 | Smith | May 7, 1957 |